July 18, 1950  H. R. GRAYBILL  2,515,447
CHEMICAL GUN TRAP
Filed Dec. 21, 1944  2 Sheets-Sheet 1

INVENTOR.
HERSHEY ROY GRAYBILL
BY
Robert E. Burns
ATTORNEY.

July 18, 1950      H. R. GRAYBILL      2,515,447
CHEMICAL GUN TRAP
Filed Dec. 21, 1944      2 Sheets-Sheet 2
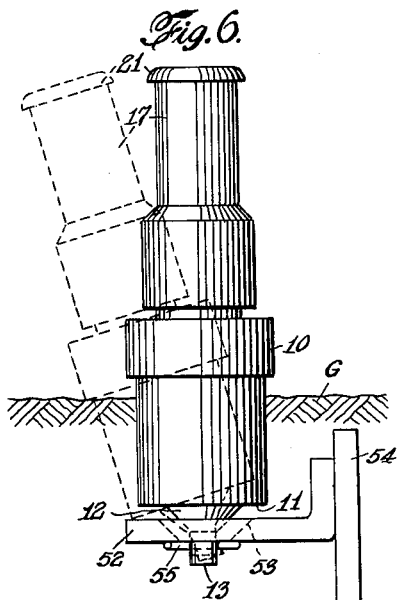
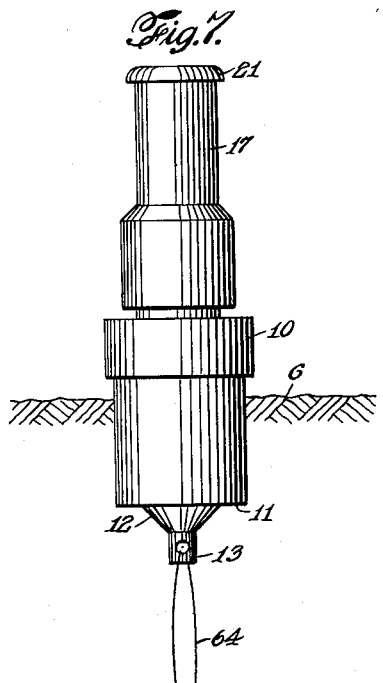
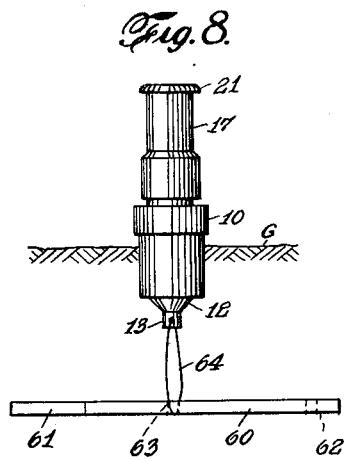
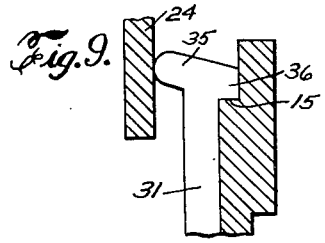
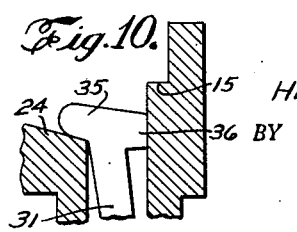
INVENTOR.
HERSHEY ROY GRAYBILL
BY
Robert E. Burns
ATTORNEY.

Patented July 18, 1950

2,515,447

UNITED STATES PATENT OFFICE 2,515,447

CHEMICAL GUN TRAP

Hershey Roy Graybill, Manheim, Pa., assignor to Animal Trap Company of America, Lititz, Pa., a corporation of Pennsylvania Application December 21, 1944, Serial No. 569,141

11 Claims. (Cl. 43—84)

The present invention relates to gun traps intended primarily for use with chemical cartridges for control of predatory animals.

As coyotes, wolves and other predatory animals are instinctively wary and difficult to catch, ordinary jaw type traps have been found unsatisfactory in controlling them. Chemical gun traps have proved much more effective. Because of their small size, chemical gun traps are easier to conceal, the trap being substantially buried in the ground, so that the only part visible is the bait, lure or other material used to attract the predator. The trap is provided with means for holding a cartridge containing the poison or other chemicals, and with firing mechanism actuated by a pull on the bait to discharge the poison or chemical into the mouth of the animal springing the trap. By employing a fast acting poison, the animal is killed almost instantly.

However, the use of gun traps of this type creates a number of difficult problems. In order to be effective, the trap must be highly sensitive so that relatively little effort or pull need be exerted by the predator to cause discharge of the cartridge. Moreover, it is desirable to avoid substantial or unusual resistance to movement of the bait that would arouse the animal's suspicions, as for example, when the predator nibbles at the bait or attempts to pull it sideways, which has been found to be the usual approach of such animals. While the trap must be highly sensitive, it must at the same time be safe so that it will not be accidentally discharged as a result of being trampled on by grazing cattle, sheep or horses, or struck and run over by a passing vehicle. Complete safety in setting and servicing the trap is also imperative to avoid injury to the persons using them. These conflicting requirements of sensitivity and safety are made still more difficult to meet by the fact that the traps must operate under extremely adverse conditions, as they are ordinarily at least partially buried in the ground where they are subjected to the deleterious effect of dirt, water, snow, ice, etc., and frequently receive rough treatment, as for example, when being driven into hard or frozen ground. Moreover, the traps must be sufficiently inexpensive that a trapper can afford to own and operate a large number of them, and must be sufficiently simple and foolproof that they can be used and serviced by persons of limited mechanical skill.

It is an object of the present invention to provide an improved gun trap fully overcoming the difficulties and problems encountered in the prior art, and to provide a trap that is inexpensive to manufacture and is of small size and light weight. A further object of my invention is to provide a trap of simple construction that is easy to service and clean and is effective under the adverse conditions encountered in use. The construction of the trap is such that the firing mechanism cannot be accidentally actuated by domestic animals, pedestrians, vehicles, or by any cause other than by the direct pull by the predator on the bait. The operating parts of the trap in accordance with my invention are completely enclosed and protected from the elements and from the entrance of sand, dirt or other foreign matter, which might enter and clog the mechanism. The completely enclosed construction results in maximum resistance to the elements, freedom from corrosion, clogging, etc. The absence of intricate parts, close tolerances and relatively small number of parts in the operating mechanism, results in low cost of manufacture, ease of operation, and ease of maintenance. Because of its simplicity and ease of operation, the trap is more sensitive than those heretofore available, with the result that much less pull or effort must be exerted by the predator to cause discharge of the trap. Moreover, the trip is anchored in such manner as to allow free movement of the gun through a wide angle, while at the same time providing a firm anchorage in any soil conditions. The freedom of movement of the trap avoids arousing the suspicion of an animal nibbling or pawing at the bait, and materially increases the effectiveness of the trap, since the gun will automatically position itself for the most effective firing.

Other objects and advantages of the invention will appear from the following description and claims, and from the accompanying drawings which show, by way of example, several embodiments of my invention.

In the drawings,

Figs. 6, 7 and 8 are elevations of further embodiments of my invention showing different forms of anchoring means.

Figure 1:
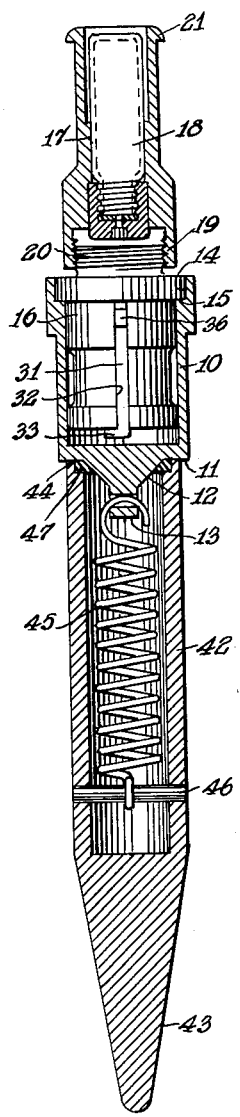
Fig. 1 is a longitudinal central sectional view of a trap in accordance with my invention, certain interior parts of the mechanism being shown in elevation.

In the drawings I have shown by way of example, several embodiments selected to illustrate my invention. The trap shown in Figs. 1 to 3 comprises a hollow cylindrical housing or socket member 10, which is open at its upper end and is closed at its lower end. The closure for the lower end of the socket may, if desired, be removable, but is shown as being integral with the side walls and comprises an annular rim or seat portion 11, a converging or frusto-conical portion 12, and a neck or lug portion 13 having a hole therethrough and referred to herein as a swivel-eye. The inner surface of the socket 10 is substantially cylindrical, but is provided near its upper end with an enlarged portion 14 and an adjacent shoulder 15.

In the socket 10 there is provided a cylindrical body portion 16 which fits into the socket with sufficient clearance as to be freely slidable therein in a longitudinal direction. The cylindrical body portion 16 is provided at its upper end with a cartridge holder, shown in the form of a cartridge chamber 17 adapted to receive and hold a cartridge 18 containing the poison or other chemical, and a propellent charge. The cartridge may, for example, be of the kind described and claimed in copending application Serial No. 548,956, filed August 11th, 1944, and issued on August 30, 1949, as Patent 2,480,593, by Richard H. Moen and myself as inventors. The cartridge chamber 17 is removably secured to the cylindrical body portion 16, for example by interengaging threaded portions 19 and 20, so that it can readily be removed to remove the shell or base portion of a fired cartridge, and insert a fresh one. The outer surface of the cartridge chamber 17 is shown provided with suitable means, such as a flange 21, for retaing the bait, lure or other material used to attract the predator for which the trap is set. The member thus serves both as a cartridge holder and as a bait holder. The cylindrical body portion 16 is hollow and contains a hollow firing pin 22, having cylindrical side walls 23 and an integral end closure 24 at its upper end. The lower end of the firing pin is open. The end closure forming the upper end of the cup shaped firing pin is provided with an upwardly projecting firing point adapted to pass through a small hole 26 in the upper end wall 27 of the cylindrical body portion 16 and strike the percussion cap or detonator of the cartridge 18 in the cartridge chamber (Fig. 3). The firing pin is actuated by a compression spring 28 which is inside the hollow cup shaped firing pin and acts between the closed upper end of the firing pin and the lower end 29 of the cylindrical body portion 16. It will be seen that the spring 28 tends to force the firing pin upwardly from the cocked position shown in Fig. 2, to the released or firing position shown in Fig. 3. One end of the cylindrical body 16— the lower end in the embodiment shown—is made removable to provide for the insertion of the firing pin and its actuating spring.

Figure 2:
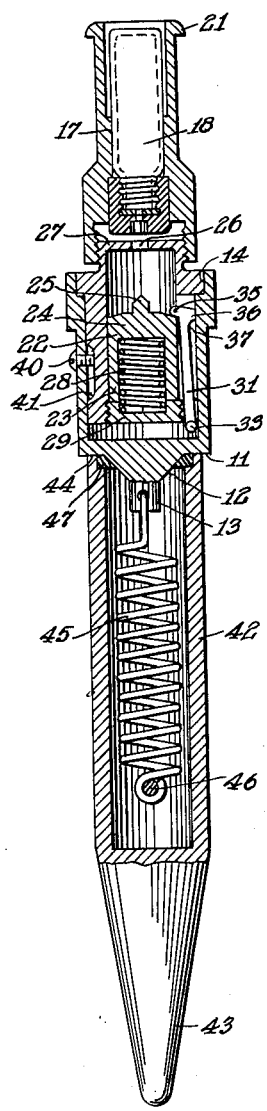
Fig. 2 is a view partially in elevation and partially in section at right angles to Fig. 1, and showing the trap mechanism in set or cocked position.
Figure 3:
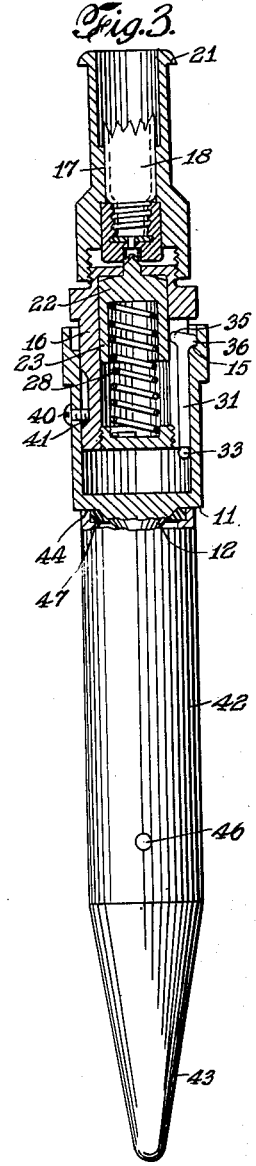
Fig. 3 is a view similar to Fig. 2, but showing the parts in the position they occupy after the trap has been sprung or discharged.
Figure 4:
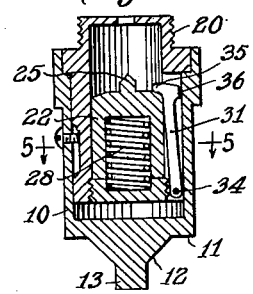
Fig. 4 is a fragmentary sectional view similar to a portion of Fig. 2, but showing a modification.
Figure 5:
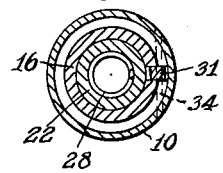
Fig. 5 is a cross section taken approximately on the line 5—5 in Fig. 4.

In the set position of the trap shown in Fig. 2, the firing pin is releasably held in cocked position by a trigger 31 which is actuated by movement of the cylindrical body 16 in the socket 10, to release the firing pin, and thereby fire a cartridge held in the cartridge holder 17. The trigger 31 is shown in the form of an elongated T-shaped member and is disposed loosely in a longitudinal slot 32 in the side of the cylindrical body portion 16. The term slot is used generically to include a groove, slot or other space for accommodating the trigger 31. The trigger member is pivotally connected at its lower end to the cylindrical body portion 16, for example, by means of an integral pivot portion 33, which projects laterally from the trigger and hooks under the lower edge of the slot 32 (Fig. 1). Alternatively, the trigger may be pivotally connected with the cylindrical body portion by a pivot pin 34 as illustrated in Figs. 4 and 5.

At its upper end the trigger is provided with an inwardly projecting nose or cam detent portion 35, and a heel or cam follower portion 36. The outer edge of the trigger is also provided with a recess 37. In the set position of the trap (Figs. 1 and 2) the heel portion 36 of the trigger engages the shoulder 15 of the socket and thereby holds the trigger in an inner position, in which the cam detent portion 35 engages the upper end edge of the cup-shaped firing pin 22, to hold the firing pin in cocked position against the action of its spring 28. It will thus be seen that in the set position of the trap, the firing pin is positively held in cocked position, thereby guarding against premature or accidental discharge of the cartridge. While the trigger engages the firing pin at one side only of its periphery in the embodiment shown in the drawings, the engagement of the cylindrical side walls of the hollow cup-shaped firing pin, with the cylindrical side walls of the body portion 16, holds the firing pin in an upright position with the firing point 25 in proper alignment with the opening 26. Moreover, any tendency of the firing pin to tip would result in its being held still more tightly and in movement of the upper end of the firing pin toward the trigger, so that the purchase of the cam detent portion 35 of the trigger on the firing pin is increased.

The trap is sprung by upward movement of the cylindrical body portion 16. In an effort to remove the bait, a predator will exert an upward pull on the cartridge holder 17 to which the bait is attached, thereby causing the cartridge holder and the connected cylindrical body portion 16 to move upwardly in a longitudinal direction relative to the socket 10. When the trigger 31 carried by the body portion 16 reaches a point where its notch or reduced portion 37 comes into alignment with the shoulder 15 of the socket, the pressure exerted on the cam detent portion 35 of the trigger by the firing pin, which is urged upwardly by the spring 28, causes the trigger to be moved laterally about its pivot in an outward direction. The lateral movement of the trigger releases the firing pin, which is thereupon forced rapidly upwardly by the compressed spring 28, causing the firing point 25 to strike and discharge the cartridge 18, propelling the charge of poison or other chemical into the mouth of the predator that has seized the bait. The upward movement of the cylindrical body with respect to the socket is suitably limited, for example, by a removable set screw 40 engaging a shoulder 41 on the cylindrical body 16, to prevent the latter being pulled out of the socket 10 in the operation of the trap. The cylindrical body 16 can, however, be removed from the socket for inspection or cleaning, by backing up or removing the set screw 40.

It will be seen that when the trap is in the sprung position illustrated in Fig. 3, the trigger 31 is held positively in an outer position by engagement of the nose portion 35 with the cylindrical side wall of the cup shaped firing pin. In this position of the firing pin the shoulder 15 of the socket lies in the notched or recessed portion 37 of the firing pin, while the heel portion 36 lies in the enlargement or recess 14 of the socket. Engagement of the heel portion 36 with the shoulder 15 prevents downward movement of the cylindrical body, and hence the cartridge and bait holder 17 relative to the socket, positively holding the cylindrical body in its outer position. The relative position of the cartridge chamber and the socket, which can at once be determined merely by looking at the trap, provides a positive indication that the firing pin is in its released or fired position.

To reset the trap the firing pin is pushed down against the action of its spring by a suitable setting tool adapted to pass through the opening 26 in the upper end of the cylindrical body portion 16. During the initial portion of the movement, the cylindrical body portion is held in its outer position by engagement of the heel portion 36 of the trigger with the shoulder 15 of the socket, the trigger being held in its outer position by engagement of the nose portion 35 with the side wall of the cup-shaped firing pin. When the firing pin reaches its cocked position, the trigger 31 swings inwardly so that the nose of the trigger moves in over the upper edge of the firing pin and the heel portion 36 rides over the shoulder 15 of the socket, permitting the cylindrical body to move downwardly into the socket. The cocking of the firing pin requires a substantial amount of pressure, and this pressure results in the cylindrical body 16 being moved directly to the fully set position illustrated in Fig. 2 immediately upon release of the cylindrical body portion for downward movement by the inward movement of the trigger. By thus avoiding any half way or hairline setting, the safety of the trap is increased. Moreover it will be noted that the trigger is moved in both directions by cam action and that positive movement is thereby assured.

The socket member 10 carrying the operating mechanism of the trap described above, is held by a suitable anchor to restrain upward movement of the socket when the predator pulls upwardly on the bait. It is a feature of the present invention that the socket is anchored in a manner that allows free swivelling of the socket about its vertical center line and allows movement of the socket in a wide angle in any direction from a vertical direction. Such movement may be the result of trampling by domestic animals or other causes, or may result from the predator pulling sideways on the bait. In the latter case the gun will automatically position itself for firing the charge of poison or other chemical into the mouth of the predator. In the form of my invention shown in Figs. 1 to 3, the socket 10 is swivelly mounted on the upper end of a hollow anchor stake 42. The stake is shown pointed at its lower end 43 to facilitate driving the stake into the ground and is open at its upper end. The socket member 10 is seated on the upper end edge 44 of the hollow anchor stake and is pivotally connected to the stake by an internal flexible member extending between the swivel eye 13 of the socket and a portion of the stake. In the particular construction shown by way of example in the drawings, the flexible member is in the form of a tension spring 45 attached at its upper end to the swivel eye 13 of the socket member and at its lower end to a pin 46 extending transversely of the hollow stake. It will be seen that this mounting permits the socket freely to turn or tip in any direction through a wide angle. Moreover, the flexible connecting means which causes the trap to return to the correct firing position after being trampled or otherwise disturbed, cannot be deformed or distorted as a result of such disturbance, and is completely enclosed and protected so that foreign matter such as grass, twigs, pebbles, etc. cannot become wedged between the spring coils. A gasket 41 can, if desired, be provided between the anchor stake 42 and the socket member to provide a further seal against entry of water or other material into the hollow stake.

A feature of the invention is that although the socket or housing member 10 is flexibly and swivelly mounted on the anchor stake, a solid connection is nevertheless provided for transmitting downwardly directed force directly from the socket to the stake. As the seating rim 11 of the socket seats directly on the upper edge of the stake, the socket is held solidly when the trap is being reset by pushing downwardly on the firing pin as described above. Moreover, any force applied to the socket to drive or push the stake into the ground is transmitted directly from the socket to the stake rather than through the flexible connecting means.

In some instances, for example in trapping animals that are particularly wary and difficult to catch, it may be undesirable for the socket to snap back to a vertical position too quickly when it has been tipped over by an animal nibbling or pawing the bait, as this might excite the animal's suspicion. With the trap of the present invention, the force tending to restore the socket to its vertical position, can be readily controlled by the tension of the flexible connecting member 45 and the shape of the interengaging portions of the socket member and the upper end of the anchor stake. For example, if the lower end of the socket is made parti-spherical to provide a ball and socket joint, the socket will tend to remain in the position to which it has been tipped.

In Fig. 6 there is shown another form of anchor means in accordance with my invention. The operating mechanism of the trap, including the housing or socket member, may be substantially the same as in the embodiment illustrated in Figs. 1 to 3 and like parts are accordingly designated by the same reference numerals. In the embodiment shown in Fig. 6 the anchor comprises a stake 50 which may conveniently be formed of a straight piece of bar or strip stock, sharpened or pointed at its lower end 51 to facilitate driving the stake into the ground. A bracket 52 having a hole or opening 53 projects laterally from the body portion of the stake, and may be formed integrally therewith, or may be made as a separate member welded, bolted, riveted, or otherwise secured to the vertical stake member. The upper end 54 of the vertical stake extends above the bracket 52 to form a driving head. The provision of a suitable driving head on the stake is of particular importance when the anchor is driven into frozen or hard ground. While the depth the anchor stake is driven into the ground may be varied as desired, the ground line has been illustrated by way of example at G.

The hole 53 in the laterally projecting bracket 52 is shown as being tapered, and is adapted to receive the swivel eye or lug 13 of the socket member 10, the lug being retained in the hole 53 by means of a transverse pin or cotter key 55 passing through the hole in the lug. As will be seen from the drawing the bracket is so shaped and formed that it supports the socket member of the trap in a manner that allows free swivelling of the socket around its vertical center line, and allows movement of the body or socket in any direction from the vertical position, as indicated by the dotted outline. When the body portion of the trap is tipped over, for example, by an animal pulling sideways on the bait, it tends to remain in tipped position and hence does not arouse suspicion of the animal. As the trap is tipped in the direction of the pull, it is automatically positioned to fire the poison or other chemical directly toward the animal, thereby increasing the effectiveness of the trap.

In Fig. 7 there is shown another form of anchor which accomplishes the same results as described above, and which may be preferred by trappers who wish the entire device to be below ground level, or where the soil is of such character that the anchor must be buried a considerable distance in order to provide satisfactory anchoring. In this form of my invention, the anchor stake 60 is formed of a piece of strip bar, rod or tube stock, pointed at its lower end 61 to facilitate driving the stake into the ground and provided with one or more holes 62, 63. The gun trap body or socket member 10 is attached to the anchor by flexible connecting means, for example, a wire loop 64 passing through the hole in the swivel eye 13 of the socket member 10 and through one of the holes 62, 63 of the anchor stake. It will be obvious that the stake or anchor may be placed in the ground vertically, horizontally, or in any other position that may seem desirable under the existing conditions or location in which the trap is set. For example, in Fig. 8 the stake 60 is buried in the ground in a substantially horizontal position, and the socket member 10 is swively connected to the central portion of the stake, for example, by a wire loop 64, or other flexible member extending between the swivel eye 13 of the socket member and the hole 63 in the anchor stake. Alternatively, the stake 60 may be driven into the ground at any desired angle to the vertical.

It will be understood that the various features of the several embodiments of my invention illustrated in the drawings are interchangeable with one another and may be combined in different ways. For example, a flexible connecting means between the socket and the anchor is equally applicable with the form of anchorage described in connection with Fig. 6. Likewise, in the embodiment illustrated in Fig. 6, resilient means may, if desired be interposed between the socket member 10 and the anchorage to return the socket to an approximately vertical position, after any tipping or sidewise displacement of the socket. For example, a spring, a soft rubber washer, or other resilient member may be interposed between the laterally projecting bracket 52 of the anchor stake 50 and the seating rim 11 of the socket. Still other combinations and embodiments of the features of my invention will be readily apparent without being specifically mentioned.

The specific means for swively connecting the gun trap with the anchor forms no part of the present application, as it has been made part of a divisional application filed by me on January 8, 1949, and which bears Serial No. 69,909.

What I claim and desire to secure by Letters Patent is:

1. A gun trap comprising a socket member, a hollow cylinder closely fitting within and longitudinally movable in said socket, a cartridge and bait holder carried by and movable with said cylinder, a firing pin longitudinally movable in said cylinder and adapted to discharge a cartridge in said cartridge holder, a spring for actuating said firing pin, and a trigger pivotally carried by said cylinder and entirely closed within said socket, said trigger having a nose portion adapted to engage said firing pin and a heel portion adapted to engage said socket in set position of the trap to hold said nose portion positively in engagement with said firing pin and thereby retain said firing pin in cocked position, said trigger being released by longitudinal movement of said cylinder relative to said socket member and being thereupon movable laterally by said firing pin to a position releasing said firing pin.

2. A gun trap comprising a socket open at its upper end, a hollow cylindrical body closed at its lower end and closely fitting within said socket for longitudinal movement therein, a cartridge and bait holder provided at the upper end of said cylindrical body and movable therewith, a hollow cylindrical firing pin open at its lower end and provided at its upper end with a firing point for discharging a cartridge in said cartridge holder, said firing pin being longitudinally movable in said cylindrical body, a compression spring in said hollow firing pin and acting between the lower end of said cylindrical body and the upper end of said firing pin to move said firing pin upwardly from a cocked position to a cartridge firing position, and a trigger for releasably holding said firing pin in cocked position, said trigger being releasable by relative longitudinal movement of said cylindrical body and socket.

3. A gun trap comprising a socket open at its upper end, a hollow cylindrical body closed at its lower end and closely fitting within said socket for longitudinal movement therein, a cartridge and bait holder provided at the upper end of said cylindrical body and movable therewith, a hollow cylindrical firing pin open at its lower end and provided at its upper end with a firing point for discharging a cartridge in said cartridge holder, said firing pin being longitudinally movable in said cylindrical body, a compression spring in said hollow firing pin and acting between the lower end of said cylindrical body and the upper end of said firing pin to move said firing pin upwardly from a cocked position to a cartridge firing position, and an elongated trigger pivotally connected at one end with said cylindrical body and having at the other end a nose portion adapted to engage said firing pin and a heel portion adapted to engage said socket in set position of the trap to hold said nose portion positively in engagement with said firing pin and thereby retain said firing pin in cocked position, said trigger being releasable by upward movement of said cylindrical body relative to said socket member to release said firing pin.

4. A gun trap comprising a socket member, a hollow cylindrical body longitudinally movable in said socket and having a longitudinally extending slot in one side thereof, a cartridge and bait holder carried by and movable with said cylindrical body, a hollow cylindrical firing pin longitudinally movable in said cylindrical body and adapted to discharge a cartridge in said cartridge holder, a spring in said hollow firing pin for actuating said firing pin, a trigger pivotally carried in said slot in said cylindrical body and having a cam detent portion adapted to engage said firing pin, and releasable means for positively holding said cam detent portion in engagement with said firing pin to hold said firing pin in cocked position, said means being released by longitudinal movement of said cylindrical body relative to said socket, and said trigger being thereupon movable by engagement of the firing pin with said cam detent portion to a position releasing said firing pin to discharge said cartridge.

5. A gun trap comprising a socket member, a hollow cylindrical body longitudinally movable in said socket and having a longitudinally extending slot in one side thereof, a cartridge and bait holder carried by and movable with said cylindrical body, a hollow cylindrical firing pin longitudinally movable in said cylindrical body and adapted to discharge a cartridge in said cartridge holder, a spring in said hollow firing pin for actuating said firing pin, and a trigger disposed in said slot in said cylindrical body, said trigger being swingable about one end as a pivot and having at the opposite end a cam detent portion adapted to engage said firing pin and a heel portion adapted to engage said socket in set position of the trap to hold said cam detent portion positively in engagement with said hollow firing pin and thereby hold said firing pin in cocked position, said trigger being released by longitudinal movement of said cylindrical body relative to said socket and being thereupon movable by engagement of the firing pin with said cam detent portion to a position releasing said firing pin to discharge said cartridge.

6. A gun trap comprising a socket member, a hollow cylindrical body longitudinally movable in said socket, a cartridge and bait holder carried by and movable with said cylindrical body, a spring actuated firing pin longitudinally movable in said cylindrical body and adapted to actuate a cartridge in said cartridge holder, and an elongated trigger pivotally connected at one end with said cylindrical body and having at the other end a cam detent portion adapted to engage said firing pin and a cam follower portion adapted to engage said socket, said trigger being swingable about its pivot from a set position in which said cam detent portion holds said firing pin in cocked position to a released position in which said firing pin is released to discharge said cartridge and being positively moved in both cocking and releasing directions by cam action.

7. A gun trap comprising a socket member, a hollow cylindrical body longitudinally movable in said socket, a cartridge and bait holder carried by and movable with said cylindrical body, a spring actuated firing pin longitudinally movable in said cylindrical body, and adapted to actuate a cartridge in said cartridge holder, and a trigger pivotally carried by said cylindrical body and having a cam detent portion adapted to engage said firing pin and a cam follower portion adapted to engage said socket, said trigger being swingable about its pivot from an inner position in which it holds said firing pin in cocked position to an outer position in which it holds said cylindrical body against movement inwardly of said socket.

8. A gun trap comprising a socket member, a hollow cylindrical body longitudinally movable in said socket, said cylindrical body having a longitudinally extending slot at one side and being closed at its lower end, a cartrige and bait holder carried by and movable with said cylindrical body, a hollow cylindrical firing pin open at its lower end and provided at its upper end with a firing point for discharging a cartridge in said cartridge holder, said firing pin being longitudinally movable in said cylindrical body, a compression spring in said hollow firing pin and acting between the lower end of said cylindrical body and the upper end of said firing pin to move said firing pin upwardly from a cocked position to a cartridge firing position, and a trigger disposed in said slot in said cylindrical body, said trigger being swingable about its lower end as a pivot and having at its upper end a cam detent portion adapted to engage the upper end of said firing pin and a cam follower portion adapted to be engaged by said socket in set position of the trap to hold said cam detent portion positively in engagement with said hollow firing pin and thereby hold said firing pin in cocked position.

9. A gun trap comprising an anchor, a socket member open at its upper end, a swivel connection between said socket and said anchor, a hollow cylindrical body closely fitting within and longitudinally movable in said socket, a cartridge and bait holder carried by and movable with said cylindrical body, an inverted cup shaped firing pin longitudinally slidable in said cylindrical body, a spring in said firing pin for actuating said firing pin, and a trigger pivotally carried by said cylindrical body and entirely enclosed within said socket, said trigger being adapted releasably to engage said firing pin to hold it in cocked position, and being releasable by an outward pull on said bait holder to release said firing pin to fire a cartridge in said cartridge holder.

10. A gun trap comprising an anchor, a socket member swivelly connected with said anchor, a hollow cylindrical body longitudinally movable in said socket, a cartridge and bait holder carried by and movable with said cylindrical body, a spring actuated firing pin longitudinally movable in said cylindrical body, and adapted to actuate a cartridge in said cartridge holder, and a trigger pivotally carried by said cylindrical body and having a cam detent portion adapted to engage said firing pin and a cam follower portion adapted to engage said socket, said trigger being swingable about its pivot from an inner position in which it holds said firing pin in cocked position to an outer position in which its holds said cylindrical body against movement inwardly of said socket.

11. A gun trap comprising a socket member, an anchor for said socket member, a flexible tension element connecting said anchor with the lower end of said socket, a hollow cylinder closely fitting within and longitudinally movable in said socket, a cartridge and bait holder carried by and movable with said cylinder, a firing pin longitudinally movable in said cylinder and adapted to discharge a cartridge in said cartridge holder, a spring for actuating said firing pin, and a trigger pivotally carried by said cylinder and entirely enclosed within said socket, said trigger having a nose portion adapted to engage said firing pin and a heel portion adapted to engage said socket in set position of the trap to hold said nose portion positively in engagement with said firing pin and thereby retain said firing pin in cocked position, said trigger being released by longitudinal movement of said cylinder relative to said socket member and being thereupon movable laterally by said firing pin to a position releasing said firing pin.

HERSHEY ROY GRAYBILL.

REFERENCES CITED

The following references are of record in the file of this patent:

UNITED STATES PATENTS

| Number | Name | Date |
|---|---|---|
| 760,274 | Thomas | May 17, 1904 |
| 1,098,742 | Lovelace | June 2, 1914 |
| 1,313,616 | Walsh | Aug. 19, 1919 |
| 1,741,902 | Alden | Dec. 31, 1929 |
| 2,301,764 | Wainwright | Nov. 10, 1942 |
| 2,377,658 | Wintersteen | June 5, 1945 |